United States Patent
Vook (10) Patent No.: US 9,900,032 B1
(45) Date of Patent: Feb. 20, 2018

(54) DIFFERENTIAL TRANSMISSION ASSEMBLY WITH COMMON MODE SUPPRESSION

(71) Applicant: Keysight Technologies, Inc., Minneapolis, MN (US)

(72) Inventor: Dietrich W. Vook, Santa Clara, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/223,901

(22) Filed: Jul. 29, 2016

(51) Int. Cl.
H04B 1/00 (2006.01)
H04B 1/04 (2006.01)

(52) U.S. Cl.
CPC .................. *H04B 1/0475* (2013.01)

(58) Field of Classification Search
CPC ............ H04B 1/00; H04B 1/581; H04L 25/03
USPC .......................................... 375/256–259, 296
See application file for complete search history.

(56) References Cited

U.S. PATENT DOCUMENTS

| 5,029,243 | A | * | 7/1991 | Dammann | ........... | B23K 1/0056 |
| | | | | | | 219/121.63 |
| 6,023,209 | A | | 2/2000 | Faulkner et al. | | |
| 6,259,496 | B1 | * | 7/2001 | Kashima | .............. | G02B 6/0043 |
| | | | | | | 349/62 |
| 7,986,020 | B2 | | 7/2011 | Kagaya | | |
| 8,063,713 | B2 | | 11/2011 | Cheng et al. | | |
| 8,508,311 | B2 | | 8/2013 | Wu et al. | | |
| 9,362,601 | B2 | | 6/2016 | McKinzie, III | | |
| 9,574,661 | B2 | * | 2/2017 | Somoza | ................... | F16H 61/66 |
| 2002/0180923 | A1 | * | 12/2002 | Aoyagi | ................ | G02B 6/0083 |
| | | | | | | 349/149 |
| 2005/0259195 | A1 | * | 11/2005 | Koganezawa | .... | G02F 1/133603 |
| | | | | | | 349/65 |
| 2010/0085132 | A1 | * | 4/2010 | Cheng | ................. | H01L 23/5228 |
| | | | | | | 333/245 |
| 2010/0171042 | A1 | * | 7/2010 | Kellerman | .............. | H01J 37/12 |
| | | | | | | 250/396 R |
| 2010/0277256 | A1 | * | 11/2010 | Concord | ............... | H01P 1/2007 |
| | | | | | | 333/177 |
| 2012/0025925 | A1 | * | 2/2012 | Wu | .......................... | H04B 3/28 |
| | | | | | | 333/12 |
| 2012/0112784 | A1 | | 5/2012 | Masuda et al. | | |

(Continued)

OTHER PUBLICATIONS

Ferran Martin, "Chapter: Other Advanced Transmission Lines," Artificial Transmission Lines for RF and Microwave Applications, 2015, pp. 410-414.

(Continued)

*Primary Examiner* — Emmanuel Bayard (57) ABSTRACT

A differential transmission assembly includes two metal prisms, a ground substrate, and a resistive sheet. The two metal prisms are driven differentially. Each metal prism extends along parallel lines with a space therebetween in a common direction, coplanar in a first plane, and contributing to formation of a three-dimensional electromagnetic field. The ground substrate extends in the common direction, in a second plane parallel to the first plane. The resistive sheet is disposed in a third plane aligned to be substantially perpendicular to an electric field component of a first mode of the three-dimensional electromagnetic field, and to be parallel to an electric field component of a second mode of the three-dimensional electromagnetic field.

16 Claims, 8 Drawing Sheets

(56) References Cited

U.S. PATENT DOCUMENTS

| | | | |
|---|---|---|---|
| 2012/0194291 A1* | 8/2012 | Pajovic | H04B 3/28 |
| | | | 333/12 |
| 2012/0239209 A1* | 9/2012 | Brown | H04L 12/2803 |
| | | | 700/278 |
| 2017/0025149 A1* | 1/2017 | Ahner | G01N 21/8806 |

OTHER PUBLICATIONS

"Differential signaling", downloaded from en.wikipedia.org/wiki/Differential_signaling no later than Sep. 28, 2017, pp. 1-5.
"Single-Ended vs Differential Inputs", downloaded from omega.com/techref/das/se-differential.html no later than Sep. 28, 2017, pp. 1-2.
Office Action dated Nov. 2, 2017 in co-pending U.S. Appl. No. 15/594,996, 16 pages [Office Action only].

* cited by examiner

Metal Prisms
202/208

Resistive Sheet
210

Ground Layer
220

DIFFERENTIAL TRANSMISSION ASSEMBLY WITH COMMON MODE SUPPRESSION

BACKGROUND

1. In modern electronics, differential signals are often used to improve signal fidelity (signal to noise ratio). Differential signaling is used in a variety of settings, including:
high speed digital circuits
analog/radio frequency circuits
high speed computation and communications equipment
high voltage circuits For computation and communications equipment, differential signaling (e.g., using a serializer/deserializer) is used to address a clock skew issue. In analog and radio frequency equipment, differential signaling reduces sensitivity to electromagnetic interference. For high voltage circuits, differential signaling can be used because both transmission mechanisms can be electrically floated, and control signals or analog signals can be provided independent of the DC offset voltage.

Differential signaling has costs too, and does not work perfectly in practice. For example, a single mode of signal propagation is typically desirable for electromagnetic signals, as multi-mode signal propagation may result in non-idealities due to coupling (interference) between signal components of the different modes. The desirable single mode may be referred to as the differential mode, an odd mode, a first mode and so on, and undesirable modes may be referred to as a common mode, an even mode, a higher order mode, a second mode, a third mode, a fourth mode and so on.

Selective filters have been used to suppress the undesirable (common, even, higher order, second/third/fourth) mode signals on differential transmission assemblies. The differential transmission assemblies are loaded with stop-band filters for the undesirable mode signals and all-pass filters for the desirable mode signals.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Whenever applicable and practical, like reference numerals refer to like elements.

DETAILED DESCRIPTION

In the following detailed description, for purposes of explanation and not limitation, representative embodiments disclosing specific details are set forth in order to provide a thorough understanding of the present teachings. Descriptions of known systems, devices, materials, methods of operation and methods of manufacture may be omitted so as to avoid obscuring the description of the example embodiments. Nonetheless, systems, devices, materials and methods that are within the purview of one of ordinary skill in the art may be used in accordance with the representative embodiments.

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

It will be understood that when an element or component is referred to as being "connected to", "coupled to", or "adjacent to" another element or component, it can be directly connected or coupled to the other element or component, or intervening elements or components may be present. In contrast, when an element is referred to as being "directly connected to" or "directly coupled to" another element or component, there are no intervening elements or components present.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Figure 1:
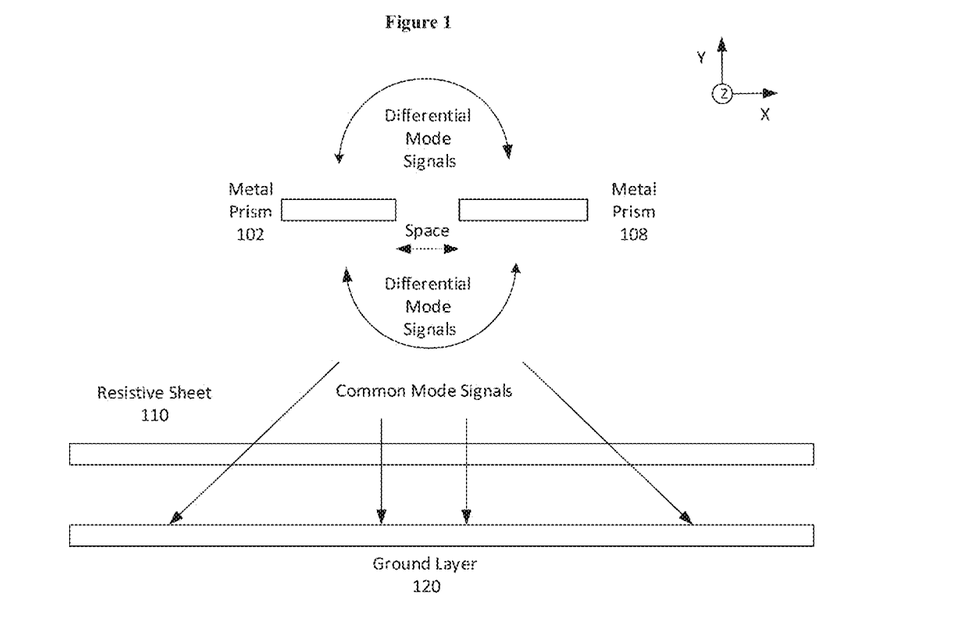
FIG. 1 shows an exemplary interior cross section of a differential transmission assembly with common mode suppression, according to an aspect of the present disclosure.

FIG. 1 is an exemplary interior cross section of a differential transmission assembly with common mode suppression, according to an aspect of the present disclosure. A "differential mode" as used herein may also be referenced as an odd mode, and the signal components provided by the differential mode are referred to herein as "differential mode signals". A "common mode" as used herein may also be referenced as, for example an even mode, and the signal components provided by the common mode are referred to herein as "common mode signals". In transmissions along a differential transmission assembly, the differential mode signal is a signal that appears differentially on two conductors, and reflects the voltage difference between the signal components carried by the two conductors. The common mode signal is a signal that appears equally on the two conductors, and reflects the absence of any difference in amplitude or polarity between the signal components carried by the two conductors.

In the descriptions provided herein, the differential signals are the signals intended in a differential transmission assembly. For the purposes of the present disclosure, common mode signals are essentially undesirable noise to be filtered or removed. This may not be true in other circumstances outside of the present disclosure, as others may wish to retain the common mode signals in certain circumstances beyond the scope of the present disclosure.

The view shown in FIG. 1 is a cross sectional outline of the differential transmission assembly in the X and Y directions shown in FIG. 1. In FIG. 1, two metal prisms 102, 108 are completely separated by a space as shown. Each metal prism 102, 108 is a solid three-dimensional object which carries a signal, and combined the metal prisms 102, 108 are used to provide a differential signal. In most embodiments described herein, electrical conductors that carry a differential signal are described as prisms. However, electrical conductors that carry a differential signal do not have to be prisms, and may have none, one, or more than one of the characteristics of a prism as follows:
- a solid geometric figure
- with two similar end faces
- with two equal end faces
- with two end faces that are parallel rectilinear figures
- with sides that are parallelograms
- with cross-sectional dimensions that are identical throughout For example, electrical conductors that carry a differential signal do not require parallel end faces, such as when the electrical conductors are wires that bend. Additionally, electrical conductors that carry a differential signal may not always have identical cross-sectional dimensions.

In the embodiment of FIG. 1, the metal prisms 102, 108 are positive (+) and negative (−) conductors of a differential transmission assembly in FIG. 1. The signal of interest is carried by differences of voltage and current between the two metal prisms 102, 108. In addition to the intended and desirable differential signal of the differential mode, the differential transmission assembly is also accompanied by at least an undesirable common (second, even) mode signal, as well as possibly additional undesirable higher order mode signals.

The intended signal provided by the two metal prisms 102, 108 is a differential signal provided by the differential mode. The differential mode signals carried by the metal prisms 102, 108 are designated by semicircular arrows in FIG. 1.

Metal prisms described herein are conductors and may use materials such as silver, copper, gold or aluminum when the metal prisms are implemented in a printed circuit board. If the metal prisms 102, 108 are implemented in a thin film circuit, the material used for such conductors may be, for example, gold.

In FIG. 1, the direction of transmission for the differential transmission assembly is the direction coming out of the page, which is the Z direction as shown. The signal is carried by the two metal prisms 102, 108. In FIG. 1, the metal prisms 102, 108 appear symmetric in size, shape and orientation on the page. Symmetry may be useful for a variety of reasons including simplicity of design; however, symmetry between the two metal prisms 102, 108 is not an absolute requirement.

In differential signaling, one of the metal prisms 102, 108 carries a positive signal, and the other of the metal prisms 102, 108 carries a negative signal that is equal to the positive signal but with the opposite polarity. The signal of interest in FIG. 1 is carried by differences of voltage and current between the metal prisms 102, 108. The metal prisms 102, 108 are driven differentially, and each contribute to formation of a three-dimensional electromagnetic field.

In the view of FIG. 1, a single front face of each metal prism 102, 108 is shown. Each metal prism 102, 108 has two end faces on opposite sides. Therefore, each metal prism 102, 108 has a single rear face (not shown) on the opposite side of the single front face shown in FIG. 1. The end faces of the metal prisms 102, 108 are parallel rectilinear figures, and as such the front and rear faces of each metal prism 102, 108 are identical and equal. Cross sections of each metal prism 102, 108 have substantially the same dimension and shape from front face to rear face.

Examples of circuits and circuitry that use differential signals and include differential transmission assemblies as shown in FIG. 1 include:
- printed circuit boards (PCBs)
- thin film circuits
- integrated circuits In FIG. 1, the differential transmission assembly also includes a ground substrate 120. In differential signaling, common mode signals between the two metal prisms 102, 108 and the bottom ground substrate 120 are unwanted.

The ground substrate 120 is a metal, whereas remaining parts of a substrate that includes the ground substrate may be a dielectric and may include materials such as sapphire, alumina, glass, fused silica, and quartz when the differential transmission assembly is for a thin film circuit. A typical thickness of substrates such as these for a thin film circuit may be 5, 10 or 20 milli-inches. Alternatively, a ground substrate for a thin film circuit may be a low temperature co-fired ceramic (LTCC).

In FIG. 1, a resistive sheet 110 is placed between the metal prisms 102, 108 and the ground substrate 120. The resistive sheet 110 is applied to attenuate common mode signals in the differential transmission assembly, and may be designed and located so as to maintain capacitance of the differential transmission assembly. Attenuation may involve reducing the amplitude of the common mode signals.

The common mode signals are designated in FIG. 1, and pass through (intersect) the resistive sheet 110. As an example, a resistive sheet 110 may be a flat resistive sheet placed on a thin dielectric and below another dielectric.

In FIG. 1, the resistive sheet 110 is placed below the metal prisms 102, 108 in such a manner so as to be mostly "outside" the differential fields but inside the common mode fields. The resistive sheet 110 thus absorbs and diminishes the common mode signals. In FIG. 1, the resistive sheet 110 is relatively close to the ground plane, and relatively far from the differential mode signals, so as to attenuate the common mode signal components without substantially attenuating the differential mode signal components.

The resistive sheet 110 can be thin or thick. However, the sheet resistance, rather than the thickness or resistivity, of the resistive sheet 110 controls the attenuation of the common mode signal components due to the fact that the common mode electric fields are predominantly tangential to the resistive sheet 110. That is, the common mode electric field will have on average more of a parallel component and less of a perpendicular component (more X, less Y in FIG. 1). Sheet resistance is inversely proportional to thickness for a given material. The thickness of the resistive sheet 110 impacts the loss of the odd mode as the odd mode is predominantly perpendicular to the resistive sheet 110. The signal attenuation is proportional to the work done by the field. For signal components that are perpendicular to the resistive sheets 110, little or no work is done, and minimal signal attenuation should be observed. For signal components that are parallel (tangential) to the resistive sheet 110, for a given resistivity (material dependent), the thicker the material, the lower the sheet resistance. In both cases, there is an optimum sheet resistance. If the sheet resistance is too low, the resistive sheet 110 acts like a metal, blocking the penetration of the fields. If the sheet resistance is too high, the resistive sheet 110 has less of an impact.

Terms such as "substantially perpendicular" and "substantially parallel" may be used herein to describe the relationship between differential mode signals or common mode signals and resistive sheets such as resistive sheet 110, but are not to be interpreted as absolutely reciprocal terms. With respect to common mode signals, substantially parallel may mean that some field lines of the common mode signals pass through the resistive layer with components that are tangential (X direction in FIG. 1) such that these field lines intersect the resistive layer more than would be true if they were to pass through the resistive layers at a perpendicular angle. With respect to differential mode signals, substantially perpendicular may mean that the field lines of the differential mode signals pass through the resistive layer at or close to 90 degree angles (if at all), such as within 5 or 10 degrees on average, such that the field lines intersect the resistive layer at or close to the minimum possible while still passing through. On the other hand, substantially parallel as used here may mean that the field lines of the common mode signals pass through the resistive layer, on average, within 45 degrees from true parallel.

That is, a thicker resistive sheet 110 attenuates a greater proportion of common mode signals than a thinner resistive sheet 110, all other factors being equal. As an explanation, the more the volume of the thicker restive sheet through which a common mode signal passes, the more resistance encountered by the common mode signal. Therefore, a thicker resistive sheet 110 will effectively attenuate common mode field components better than a thinner resistive sheet 110. Common mode field components will typically be attenuated least when arriving at the resistive sheet 110 at a perpendicular angle, since the path through the resistive sheet 110 will traverse the least possible volume of the resistive sheet 110 at the perpendicular angle. As a result, a thin resistive sheet 110 attenuates mostly common mode signals for fields that are not perpendicular to the resistive sheet 110 whereas the thicker resistive sheet 110 attenuates a greater portion of common mode signals with components that include a parallel element (in the X direction in FIG. 1). In any event, the thin resistive sheet 110 is not intended to attenuate differential mode signals, and any such attenuation is inconsequential when using the teachings of the present disclosure. This is shown in FIG. 1 inasmuch as the indications for the differential mode signals do not intersect with the resistive sheet 110.

In the present disclosure, the resistive sheet 110 may be made as thin as possible for a variety of reasons, even if this reduces attenuation for common mode signals, such as in fields perpendicular to the resistive sheet 110. The resistive sheet 110 may have a characteristic sheet resistance of approximately 100 Ohms/square, within a range of approximately 50 Ohms/square and 150 Ohms/square. The resistivity of the resistive sheet is selected so as to maintain propagation of the electric field components of the differential mode of the three-dimensional electromagnetic field formed (in part) by the metal prisms 102, 108. The resistive sheet 110 may also be located so as to maintain capacitance of the differential transmission assembly.

In representative embodiments, the resistive sheet 110 may be continuous and extend along the direction of propagation of the differential transmission assembly in FIG. 1. The continuity of the resistive sheet is useful inasmuch as, for example, such continuity contributes to attenuating the common mode signal components that accompany the differential transmission assembly. As such, the resistive sheet 110 may also be discontinuous in the direction of propagation, so long as the lack of continuity does not, for example, substantially reduce the attenuation of the common mode signal components.

The differential transmission assembly in FIG. 1 may have an outline of any appropriate shape, including a circle, ellipse, rectangle, square, or other shape. A differential transmission assembly as in FIG. 1 or other Figures herein may also include other elements such as dielectrics. Of course, the outline of a differential transmission assembly described herein does not require a smooth or common outline of the nature of the shapes mentioned above; rather, elements of a differential transmission assembly described herein may be exposed, for example when installed on a printed circuit board. Stated another way, a differential transmission assembly described herein does not necessarily require an outer sheath or shield of the sort that would be found in, for example, a cable.

The two metal prisms 102, 108 may be any suitable electrical conductor such as a copper wire, or other metal, metal alloy, or alternatively may be a non-metal electrical conductor. Dielectric materials or layers contemplated for the differential transmission assembly may include, but are not limited to glass fiber material, plastics such as polytetrafluoroethylene (PTFE), low-k dielectric material with a reduced loss tangent (e.g., 10-2), ceramic materials, liquid crystal polymer (LCP), or any other suitable dielectric material, including air, and combinations thereof.

Examples of resistive sheets as described herein include coatings on dielectric materials. For example, a thin resistive sheet may include materials such as TaN, WSiN, resistivelyloaded polyimide, graphite, graphene, nickel phosphide (NiP), transition metal dichalcogenide (TMDC), nichrome (NiCr), nickel phosphorus (NiP), indium oxide, and tin oxide. The resistor materials may also be standard thin film resistor materials such as titanium nitride (TiN) or titanium tungsten (TiW). In a thin film circuit, the materials for a resistive sheet may be graphite, graphene, NiP, NiCr, or standard thin film resistor materials (TiN, TiW etc.), whereas in a printed circuit board the materials for a resistive sheet may be include graphite, graphene, NiP, NiCr. For a printed circuit board (PCB), any standard PCB resistor material may be used so long as the thickness and conductivity are appropriate and have a thickness less than a few microns with sheet resistance between 10 and 200 Ohms/square. Another example of a material for a printed circuit board may include a conductive polymer.

Transition metal dichalcogenides (TMDCs) include: HfSe2, HfS2, SnS2, ZrS2, MoS2, MoSe2, MoTe2, WS2, WSe2, WTe2, ReS2, ReSe2, SnSe2, SnTe2, TaS2, TaSe2, MoSSe, WSSe, MoWS2, MoWSe2, PbSnS2. The chalcogen family includes the Group VI elements S, Se and Te. A resistive sheet may have an electrical sheet resistance between 20-2500 ohms/sq and preferably between 50-150 ohms/sq.

Figure 2:
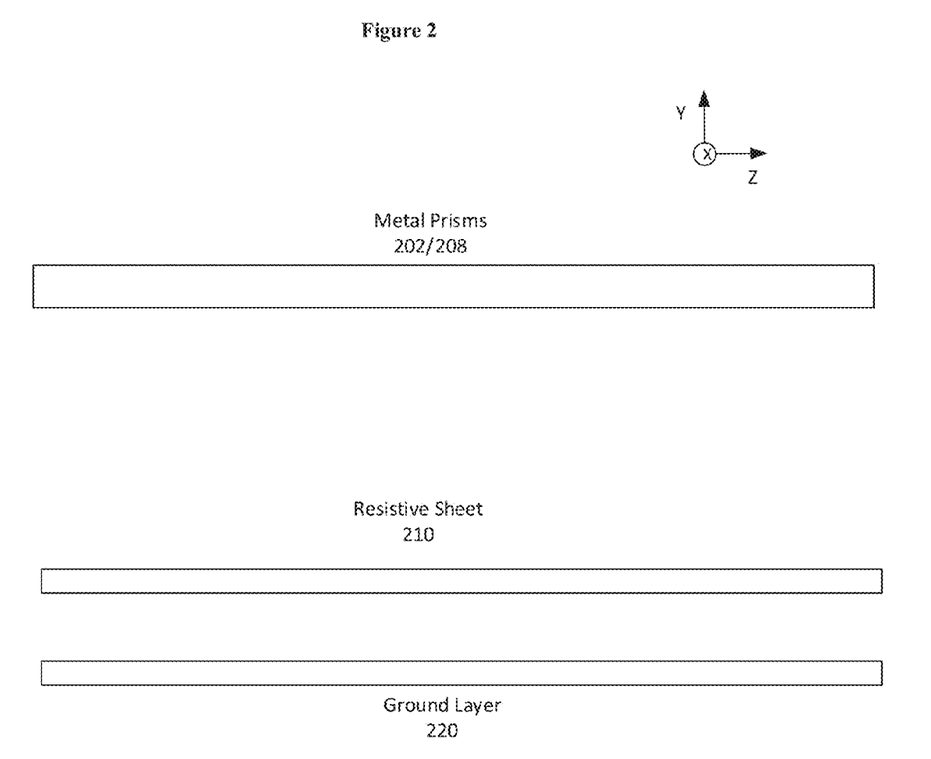
FIG. 2 shows an exemplary interior profile of the differential transmission assembly with common mode suppression in FIG. 1, according to an aspect of the present disclosure.

FIG. 2 shows an exemplary interior profile of the differential transmission assembly with common mode suppression in FIG. 1, according to an aspect of the present disclosure. The view shown in FIG. 2 is an outline of the dimensions in the Y and Z directions shown in FIG. 1. In FIG. 2, the metal prisms 202, 208 are above the resistive sheet 210, which in turn is above the ground substrate 220. Each of the elements in FIG. 2 is shown extending the same width, which in FIG. 1 would be the depth into the page.

Figure 3:
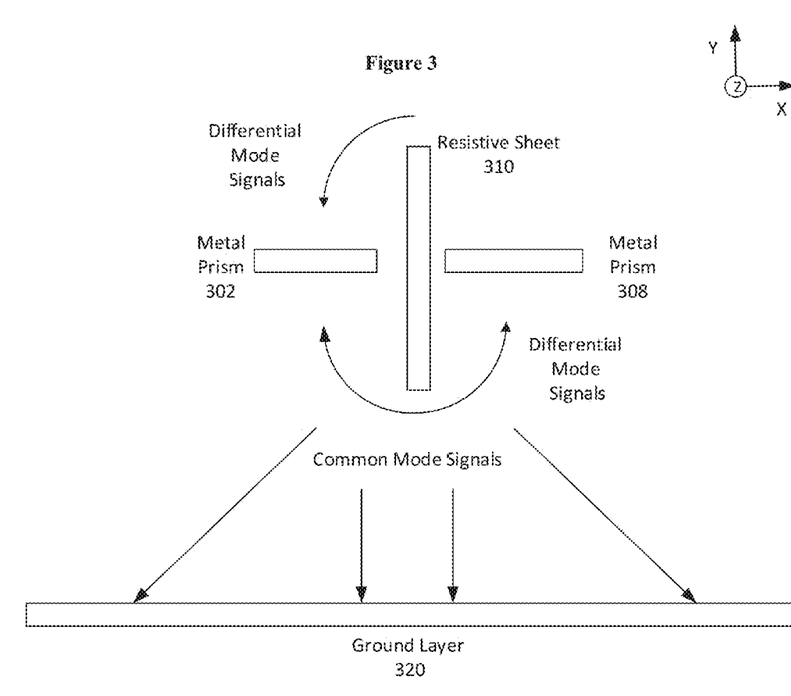
FIG. 3 shows an exemplary interior cross section of another differential transmission assembly with common mode suppression, according to an aspect of the present disclosure.

FIG. 3 shows an exemplary interior cross section of another differential transmission assembly with common mode suppression, according to an aspect of the present disclosure. The view shown in FIG. 3 is again an outline of the dimensions in the X and Y directions shown in FIG. 3. In FIG. 3, two metal prisms 302, 308 are again separated by a space. However, in FIG. 3, a resistive sheet 310 is inserted into the space between the two metal prisms 302, 308. Explanations similar to those above for FIG. 1 are omitted for the sake of avoiding redundancy.

In FIG. 3, the resistive sheet 310 is placed between the metal prisms 302, 308, and is again applied to attenuate common mode signals in a differential transmission assembly. The resistive sheet 310 is again made as thin as possible, and is centered between and bisects the metal prisms 302, 308. The electric fields of the differential signal are, on average, substantially perpendicular to the resistive sheet 310 when they intersect the resistive sheet 310. As noted above, substantially perpendicular as the term is used herein, may be taken to mean within 10 or even 5 degrees of perpendicular on average for field components of a differential signal The electric fields of the common mode signals intersect the resistive sheet 310 more extensively, and, on average, substantially less perpendicularly than the electric fields of the differential mode signals. As a result, the attenuation of the common mode signals by the resistive sheet 310 is much more significant than any unintended attenuation of the differential mode signals.

As an example of a way a resistive sheet can be placed between the metal prisms 302, 308 in a wafer process, metal prisms 302, 308 are metal assemblies of finite thickness. In such a process, conformal dielectric films are deposited to produce "bread loafing". Further, in the wafer process, depositing on non-flat surfaces is known, as is the use of directional etches such as reactive ion etching (RIE) to leave a film on the steep sidewalls of dielectric. Using such a deposition and etching process, a resistive sheet 310 can be placed, and then buried by further conformal or planarizing dielectric depositions.

Figure 4:
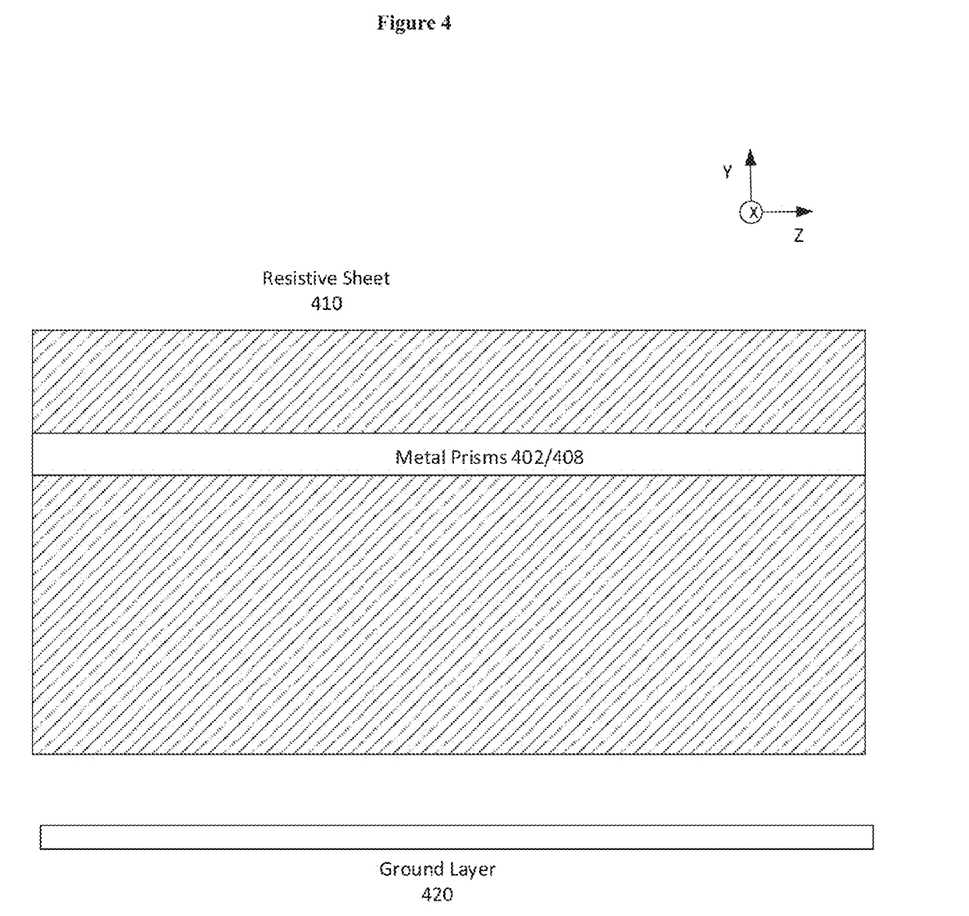
FIG. 4 shows an exemplary interior profile of the differential transmission assembly with common mode suppression in FIG. 3, according to an aspect of the present disclosure.

FIG. 4 shows an exemplary interior profile of the differential transmission assembly with common mode suppression in FIG. 3, according to an aspect of the present disclosure. The view shown in FIG. 4 is an outline of the dimensions in the Y and Z directions shown in FIG. 3. In FIG. 4, the right-most metal prism 308 in FIG. 3 is shown as metal prism 408 in front of resistive sheet 410 (hatched). The left-most metal prism 302 in FIG. 3 is not shown insofar as it is behind the resistive sheet 410. Each of the elements in FIG. 4 is shown extending the same width, which in FIG. 3 would be the depth into the page.

Figure 5:
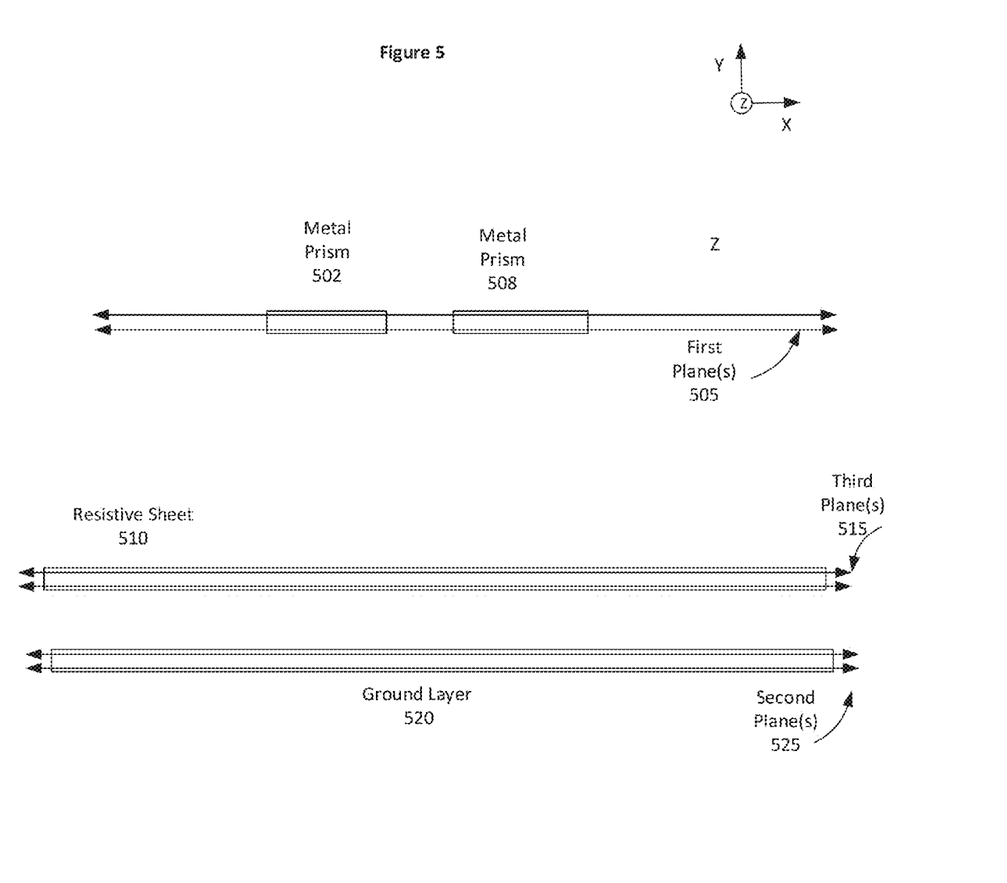
FIG. 5 shows another view of the exemplary interior cross section of a differential transmission assembly with common mode suppression in FIG. 1, according to an aspect of the present disclosure.

FIG. 5 shows another view of the exemplary interior cross section of a differential transmission assembly with common mode suppression in FIG. 1, according to an aspect of the present disclosure. In FIG. 5, two first planes 505 are shown passing through two metal prisms 502, 508. The first planes 505 exist in the X-Z plane in FIG. 5, and the two shown are demonstrative of the fact that metal prisms 502, 508 are three dimensional objects that extend in the Z direction and are coplanar in multiple parallel planes.

In FIG. 5, two second planes 525 are shown passing through ground substrate 520. The second planes 525 exist in the X-Z directions in FIG. 5. Second planes 525 are demonstrative of the fact that the ground substrate 520 is a three dimensional object that extends in the Z direction, and exists in multiple parallel planes in the X-Z directions.

In FIG. 5, two third planes 515 are shown passing through resistive sheet 510. The third planes 515 exist in the X-Z directions in FIG. 5. Third planes 515 are demonstrative of the fact that the resistive sheet 510 is a three dimensional object that extends in the Z direction, and exists in multiple parallel planes in the X-Z directions.

In FIG. 5, the first planes 505, second planes 525, and third planes 515 are all parallel to one another. In FIG. 5, each of the metal prisms 502, 508, the resistive sheet 510, and the ground substrate 520 may be considered to have six significant sides including a top and bottom, a left side and right side, the front side (shown) and a rear side. In FIG. 5, the two largest sides of each of the metal prisms 502, 508, the resistive sheet 510, and the ground substrate 520, are the tops and bottoms. The first planes 505, second planes 525, and third planes 515 are all parallel or substantially parallel to the tops and bottoms of the metal prisms 502, 508, the resistive sheet 510, and the ground substrate 520. As noted, the ground substrate 520 is a metal, but the remainder of a substrate that includes the ground substrate 520 is a dielectric support material.

Figure 6:
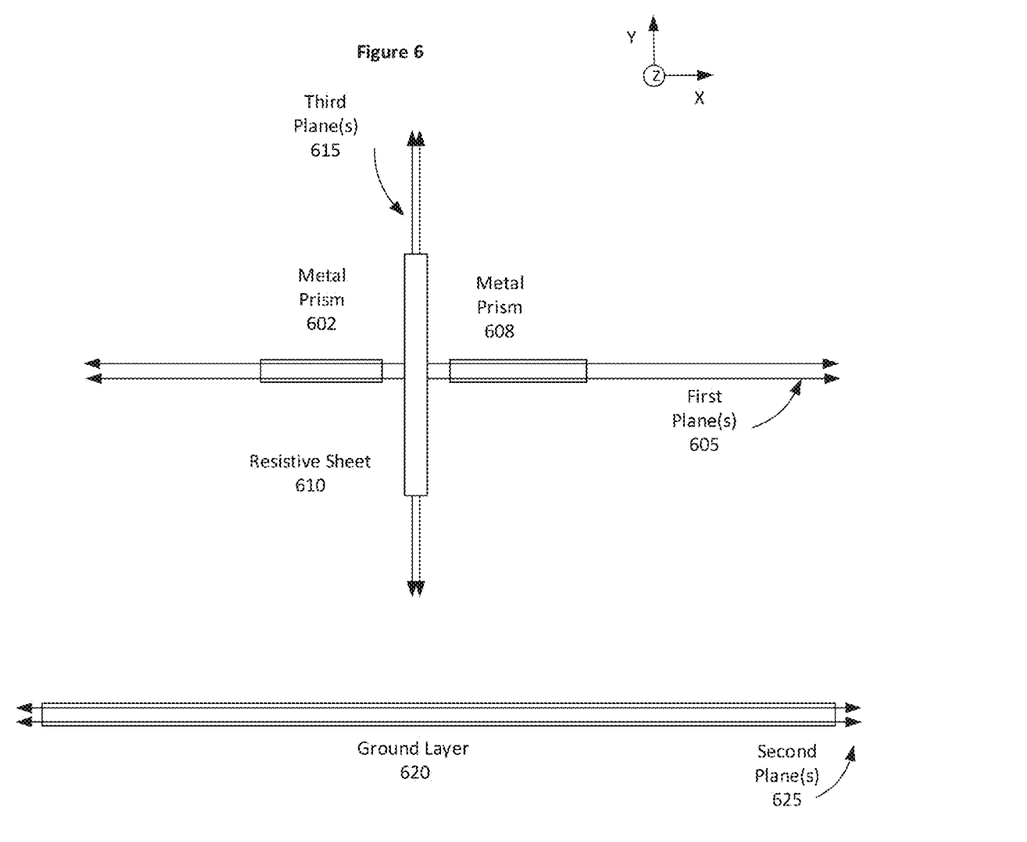
FIG. 6 shows another view of the exemplary interior cross section of a differential transmission assembly with common mode suppression in FIG. 3, according to an aspect of the present disclosure.

FIG. 6 shows another view of the exemplary interior cross section of a differential transmission assembly with common mode suppression in FIG. 3, according to an aspect of the present disclosure. In FIG. 6, two first planes 605 are shown passing through two metal prisms 602, 608. The first planes 605 exist in the X-Z plane in FIG. 6, and the two shown are demonstrative of the fact that metal prisms 602, 608 are three dimensional objects that extend in the Z direction and are coplanar in multiple planes.

In FIG. 6, two second planes 625 are shown passing through ground substrate 620. The second planes 625 exist in the X-Z directions in FIG. 6. Second planes 625 are demonstrative of the fact that the ground substrate is a three dimensional object that extends in the Z direction, and exists in multiple parallel planes in the X-Z directions.

In FIG. 6, two third planes 615 are shown passing through resistive sheet 610. The third planes 615 exist in the Y-Z directions in FIG. 6. Third planes 615 are demonstrative of the fact that the resistive sheet 610 is a three dimensional object that extends in the Z direction, and exists in multiple parallel planes in the X-Z directions.

In FIG. 6, the first planes 605 and second planes 625 are all parallel to one another, and the third planes 615 are both parallel to one another. In FIG. 6, each of the metal prisms 602, 608, the resistive sheet 610, and the ground substrate 620 may be considered to have six significant sides including a top and bottom, a left side and right side, the front side (shown) and a rear side. In FIG. 6, the two largest sides of each of the metal prisms 602, 608, the resistive sheet 610, and the ground substrate 620, are the tops and bottoms. The first planes 605 and second planes 625 are parallel or substantially parallel to the tops and bottoms of the metal prisms 602, 608 and ground substrate 620. The third planes 615 are parallel or substantially parallel to the tops and bottoms of the resistive sheet 610.

Figure 7:
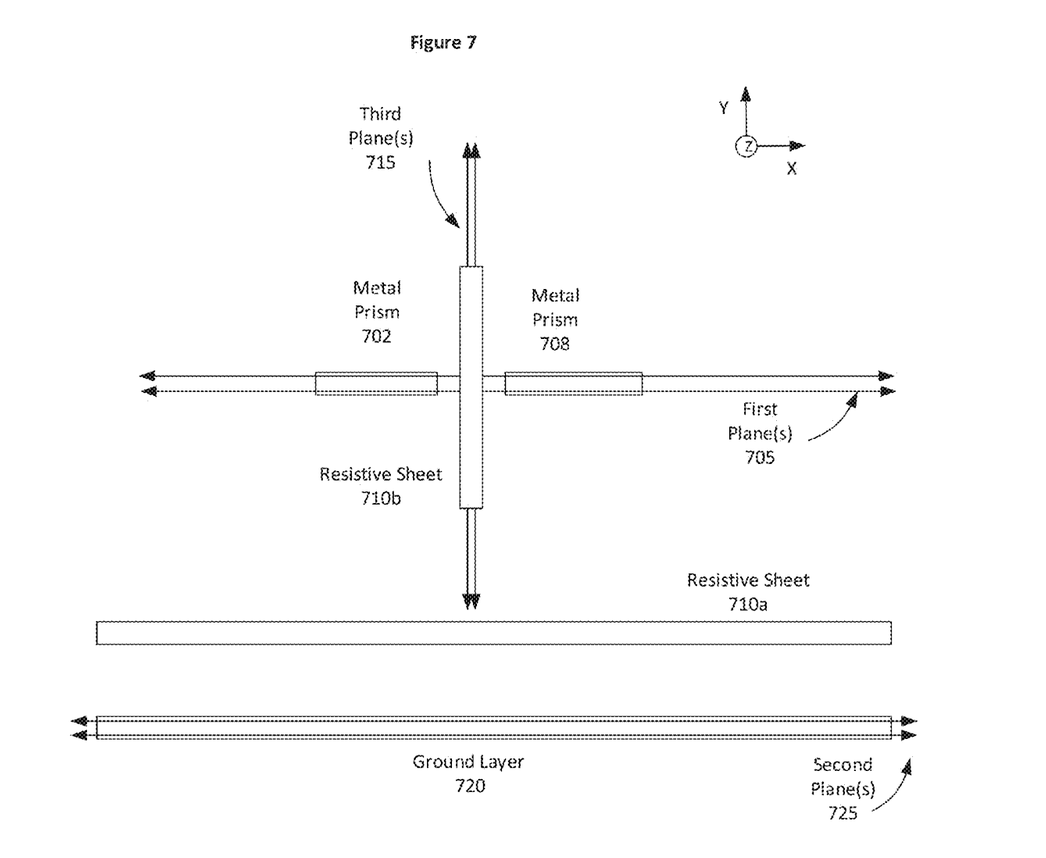
FIG. 7 shows an exemplary interior cross section of another differential transmission assembly with common mode suppression, according to an aspect of the present disclosure.

FIG. 7 shows an exemplary interior cross section of a differential transmission assembly with common mode suppression, according to an aspect of the present disclosure. The view shown in FIG. 7 is an outline of the dimensions in the X and Y directions shown in FIG. 7. In FIG. 7, two metal prisms 702, 708 are completely separated by a space as shown. Each metal prism 702, 708 is a three-dimensional object which carries a signal, and combined the metal prisms 702, 708 are used to provide a differential signal.

In differential signaling, one of the metal prisms 702, 708 carries a positive signal, and the other of the metal prisms 702, 708 carries a negative signal that is equal to the positive signal but with the opposite polarity. The signal of interest in FIG. 7 is carried by differences of voltage and current between the metal prisms 702, 708. The metal prisms 702, 708 are driven differentially, and each contribute to formation of a three-dimensional electromagnetic field.

In the view of FIG. 7, a single front face of each metal prism 702, 708 is shown. Each metal prism 702, 708 is a solid object with two similar end faces on opposite ends. Therefore, each metal prism 702, 708 has a single rear face (not shown) on the opposite side of the front face shown in FIG. 7. The end faces of the two metal prisms 702, 708 are equal. The end faces of the metal prisms 702, 708 are also parallel rectilinear figures. Cross sections of each metal prism 702, 708 have substantially the same dimension and shape from front face to rear face.

Examples of circuits and circuitry that use differential signaling as shown in FIG. 7 include:
  printed circuit boards (PCBs)
  thin film circuits
  integrated circuits In FIG. 7, the differential transmission assembly also includes a ground substrate 720. As noted with respect to FIG. 1 and other embodiments herein, in differential signaling, signals that are common between the two metal prisms 702, 708 and the bottom ground substrate 720 may be unwanted.

In FIG. 7, a resistive sheet 710a is placed between the metal prisms 702, 708 and ground substrate 720. The resistive sheet 710a is applied to a common mode signal in the differential transmission assembly. The common mode signals in FIG. 7 would be similar to the common mode signals in FIGS. 1 and 3, and, on average, intersect the resistive sheet 710a much more than differential mode signals. As an example, a resistive sheet 710a may be a flat resistive sheet placed on a thin dielectric and below another dielectric.

In FIG. 7, the resistive sheet 710a is placed below the metal prisms 702, 708 in such a manner so as to be mostly "outside" the differential fields, but within the common mode fields. The resistive sheet 710a thus absorbs and diminishes the common mode signals. In FIG. 7, the resistive sheet 710a is relatively close to the ground plane, and relatively far from the differential mode signals.

The resistive sheet 710a can be thin or thick. A thicker resistive sheet 710 attenuates more common mode signals than a thin resistive sheet 710a. In any event, the thin resistive sheet 710a is not intended to attenuate differential mode signals, and any such attenuation is inconsequential when using the teachings of the present disclosure. This is shown in FIG. 7 inasmuch as the indications for the differential mode signals do not intersect with the resistive sheet 710a.

In the present disclosure, the resistive sheet 710a may be made as thin as possible for a variety of reasons, even if this reduces attenuation for common mode signals. The resistive sheet 710a has a characteristic sheet resistance of approximately 100 Ohms/square, within a range of approximately 50 Ohms/square and 150 Ohms/square. The resistivity of the resistive sheet is selected so as to maintain propagation of the electric field components of the differential mode of the three-dimensional electromagnetic field formed (in part) by the metal prisms 702, 708. The resistive sheet 710a may also be located so as to maintain capacitance of the differential transmission assembly.

In FIG. 7, a resistive sheet 710b is inserted into the space between the two metal prisms 702, 708. Explanations similar to those above for FIG. 3 are omitted for the sake of avoiding redundancy.

In FIG. 7, the resistive sheet 710b is placed between the metal prisms 702, 708, and is again applied to attenuate common mode signals in a differential transmission assembly. The resistive sheet 710b is again made as thin as possible, and is centered between and bisects the metal prisms 702, 708. The electric fields of the differential mode signal are mostly perpendicular to the resistive sheet 710b at intersections. The electric fields of the common mode signals intersect the resistive sheet 710b much more, on average, than the differential mode signals. As a result, the attenuation of the common mode signals by the resistive sheet 710b is much more significant than any unintended attenuation of the differential signals.

In an example, the differential transmission assemblies described herein can be used in an apparatus such as a computer system with a processor and memory. For example, a differential transmission assembly can be used to connect a microprocessor to a memory. A computer system that includes the differential transmission assembly described herein may be a standalone device or may be connected, for example, using a network, to other computer systems or peripheral devices. Such a computer system can be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a camera, a web appliance, a network router, switch or bridge, or any other machine.

Figure 8:
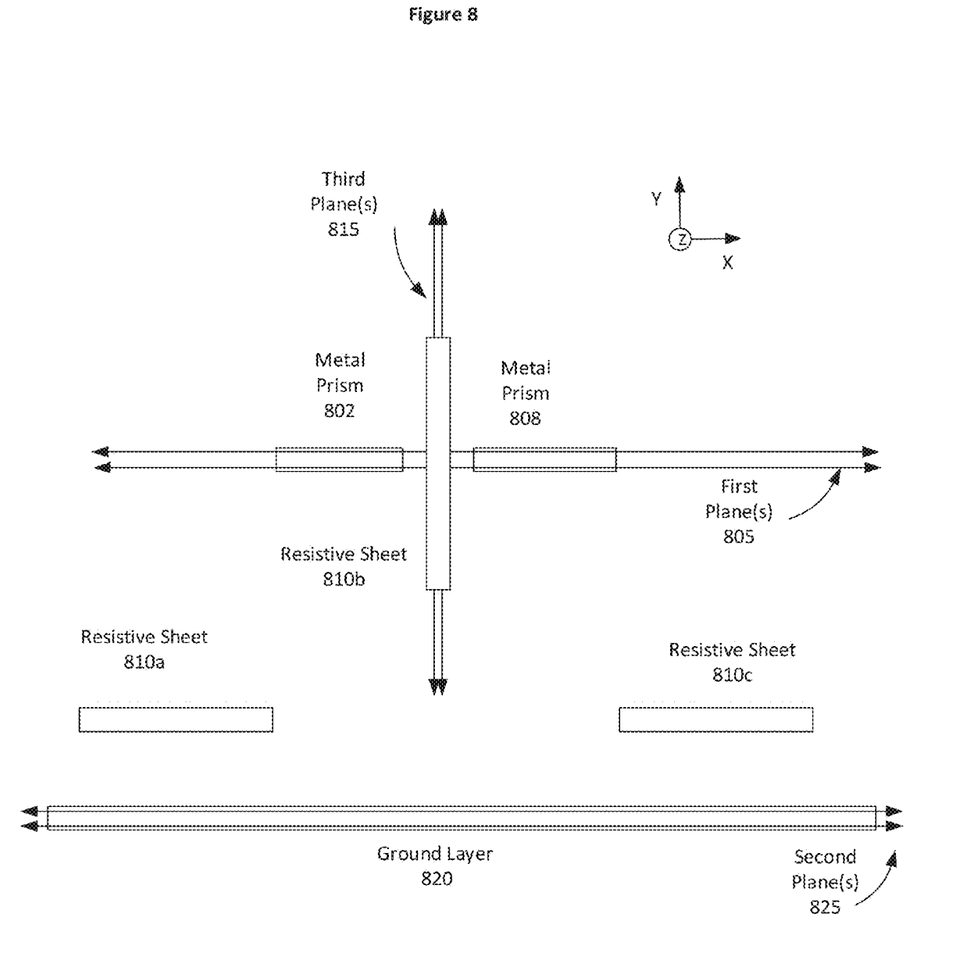
FIG. 8 shows an exemplary interior cross section of another differential transmission assembly with common mode suppression, according to an aspect of the present disclosure.

FIG. 8 shows an exemplary interior cross section of another differential transmission assembly with common mode suppression, according to an aspect of the present disclosure. In FIG. 8, the differential transmission assembly includes three resistive sheets 810*a*, 810*b* and 810*c*. Two resistive sheets 810*a* and 810*c* are aligned in a plane parallel or substantially parallel to the second plane(s) through which the ground substrate 820 runs, and parallel or substantially parallel to the first plane through which metal prisms 802, 808 run. Similar to the embodiment of FIG. 7, another resistive sheet 810*b* is placed between the two metal prisms 802, 808, to achieve the same or similar results as resistive sheet 710*b* in FIG. 7.

In FIG. 8, the two resistive sheets 810*a* and 810*c* are spaced apart in order to maintain capacitance of the differential transmission assembly. That is, resistive sheets 810*a* and 810*c* will attenuate common mode signal components, but the spacing between the resistive sheets 810*a* and 810*c* will allow the overall assembly to better maintain capacitance.

In FIG. 8, two resistive sheets 810*a* and 810*c* are shown spaced apart and coplanar such that a gap is left under the metal prisms 802, 808 and the remaining resistive sheet 810*b*. However, the number of such coplanar resistive sheets, and the relative spacing between two or more such resistive sheets may vary. For example, an additional resistive sheet may be placed under the resistive sheet 810*b* with the benefit of improving the attenuation of common mode signals, but at the cost of a more complex production and some additional loss of capacitance of the differential transmission assembly.

The present disclosure describes resistive sheets applied to suppress common mode and higher order modes. This application of resistive sheets is used to suppress common mode signals in a differential transmission assembly. As context, a cross sectional view of a differential transmission assembly on a printed circuit board (PCB) or thin film circuit would appear as two horizontal metal segments aligned horizontally with a space between. The signal of interest is carried by differences of voltage and current between the two metal segments. Signals that are common between these segments and a bottom ground signal are of interest in the present disclosure, as these signals may be unwanted. Using resistive sheets as described herein avoids complicated printed circuit board or thin film designs, does not add significant bulk to a differential transmission assembly, and is not restricted to specific (narrow) frequency bands.

Accordingly, differential transmission assembly with common mode suppression enables a simple mechanism to suppress common mode signals. The differential transmission assembly described herein is simpler than using resonators in some or possibly all cases. That is, using the differential transmission assembly described herein, common mode signals can be appropriately attenuated without imposing intolerable losses on differential mode signals. In turn, the differential transmission assembly described herein can then provide greater bandwidth than would otherwise be possible.

Additionally, the differential transmission assembly described herein is broadband. This is more useful than a solution that offers common mode suppression over a narrow range of frequencies.

Moreover, the differential transmission assembly described herein is applicable to a wide variety of differential signal structures. The differential transmission assembly described herein is applicable to printed circuit boards (PCBs), thin film circuits, hybrid circuits, and to analog and digital integrated circuits (ICs).

Many applications existing for a differential transmission assembly in, for example, a printed circuit board (PCB) or integrated circuit. Such applications may include Wired local area networks (LANs), such as gigabit Ethernet. Such wired local area networks may use numerous pairs of wires to run differential signals. The "common mode" filter aspect of the present disclosure may be used on each end of the pairs of wires, or anywhere before the signals run into an analog to digital converter (ADC) before being processed by a digital signal processor (DSP) dedicated to extracting the signals.

Lines from a differential antenna to a receiver. Such lines be adapted to include a differential transmission assembly as a (relatively) small circuit at one end to suppress any common mode signal.

A radio frequency (RF) instrument. Such instruments are typically constructed on a printed circuit board, but may be implemented using a microwave "thin film circuit" on a thin film substrate such as sapphire, alumina or fused silica. A differential transmission assembly may be used to "clean up" the signals, by using a "balun" (i.e., transformer used to convert an unbalanced signal to a balanced signal). A differential transmission assembly as described herein may be used as part of a balun, to "clean up" the signal and eliminate residual common mode signal components, or to make a broader bandwidth balun.

For digital communications between parts of a computer system, such as standard PCI Express. Each "lane" of PCI Express sends "packets" down differential pairs, in a manner very similar to Ethernet (described above).

For signals on a thin film circuit as micro-strip, a differential transmission assembly can be laid out to carry differential signals. This implementation would appear very similar to one or more of the arrangements shown in FIGS. 1-8. Signals in micro-strip can also be single ended, with just one metal line and a ground plane below it the one metal line.

For signals on a thin film stripline, a differential transmission assembly can be arranged with a ground sheet above and below a central conductor. An additional dielectric layer could be added above the two conductors shown in FIGS. 1-8, and a grounded metal sheet could be provided above such a dielectric layer.

Although differential transmission assembly with common mode suppression has been described with reference to several exemplary embodiments, it is understood that the words that have been used are words of description and illustration, rather than words of limitation. Changes may be made within the purview of the appended claims, as presently stated and as amended, without departing from the scope and spirit of differential transmission assembly with common mode suppression in its aspects. Although differential transmission assembly with common mode suppression has been described with reference to particular means, materials and embodiments, differential transmission assembly with common mode suppression is not intended to be limited to the particulars disclosed; rather differential transmission assembly with common mode suppression extends to all functionally equivalent structures, methods, and uses such as are within the scope of the appended claims.

Although the present specification describes components and functions that may be implemented in particular embodiments with reference to particular standards and protocols, the disclosure is not limited to such standards and protocols. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present disclosure, a differential transmission assembly includes two metal prisms that are driven differentially. Each metal prism extends along parallel lines in a common direction. The two metal prisms are spaced from one another. The parallel lines are coplanar in a (first) plane. The two metal prisms each contribute to formation of a three-dimensional electromagnetic field. The differential transmission assembly also includes a ground substrate extending in the common direction, in a (second) plane parallel to the (first) plane. The differential transmission assembly also includes a resistive sheet in a (third) plane aligned to be substantially perpendicular to an electric field component of a first mode of the three-dimensional electromagnetic field. The resistive sheet is also aligned to be parallel to an electric field component of a second mode of the three-dimensional electromagnetic field.

According to another aspect of the present disclosure, the third plane is substantially parallel to the second plane and the first plane.

According to still another aspect of the present disclosure, the resistive sheet is located so as to maintain capacitance of the differential transmission assembly.

According to yet another aspect of the present disclosure, edges of the resistive sheet extend outside a region defined by the two metal prisms and the ground substrate.

According to another aspect of the present disclosure, the third plane is substantially perpendicular to the second plane and the first plane. The resistive sheet in the third plane is provided in the space between the two metal prisms.

According to still another aspect of the present disclosure, the resistive sheet is centered between and bisects the space between the two metal prisms.

According to yet another aspect of the present disclosure, resistivity of the resistive sheet is selected so as to maintain propagation of the electric field component of the first mode of the three-dimensional electromagnetic field.

According to another aspect of the present disclosure, the resistive sheet has a characteristic sheet resistance between approximately 50 Ohms/square and 150 Ohms/square.

According to another aspect of the present disclosure, the resistive sheet has a characteristic sheet resistance of approximately 100 Ohms/square.

According to yet another aspect of the present disclosure, the differential transmission assembly comprises a printed circuit board.

According to another aspect of the present disclosure, the differential transmission assembly comprises an integrated circuit.

According to another aspect of the present disclosure, an electric field of a differential signal carried by the differential transmission assembly is predominately perpendicular to the third plane. An electric field component of a common mode signal carried by the differential transmission assembly is predominately parallel to the third plane.

According to yet another aspect of the present disclosure, the resistive sheet reduces amplitudes of the common mode signal.

According to still another aspect of the present disclosure, the differential transmission assembly is implemented in a micro-strip.

According to another aspect of the present disclosure, the differential transmission assembly is implemented in a strip-line.

According to yet another aspect of the present disclosure, the differential transmission assembly is implemented in a filter. For example, a microstrip balance-to-unbalance design may include a filter that improves broadband bandwidth while also improving common mode rejection using the differential transmission assemblies described herein.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A differential transmission assembly, comprising:
two metal prisms that are driven differentially, each extending along parallel lines with a space therebetween in a common direction, coplanar in a first plane, and contributing to formation of a three-dimensional electromagnetic field;
a ground substrate extending in the common direction, in a second plane parallel to the first plane, and
a resistive sheet in a third plane aligned to be substantially perpendicular to an electric field component of a first mode of the three-dimensional electromagnetic field, and to be parallel to an electric field component of a second mode of the three-dimensional electromagnetic field.

2. The differential transmission assembly of claim 1, wherein the third plane is substantially parallel to the second plane and the first plane.

3. The differential transmission assembly of claim 2, wherein the resistive sheet is located so as to maintain capacitance of the differential transmission assembly.

4. The differential transmission assembly of claim 2, wherein edges of the resistive sheet extend outside a region defined by the two metal prisms and the ground substrate.

5. The differential transmission assembly of claim 1, wherein the third plane is substantially perpendicular to the second plane and the first plane, and
wherein the resistive sheet in the third plane is provided in the space between the two metal prisms.

6. The differential transmission assembly of claim 5, wherein the resistive sheet is centered between and bisects the space between the two metal prisms.

7. The differential transmission assembly of claim 1, wherein resistivity of the resistive sheet is selected so as to maintain propagation of the electric field component of the first mode of the three-dimensional electromagnetic field.

8. The differential transmission assembly of claim 1, wherein the resistive sheet has a characteristic sheet resistance between approximately 50 Ohms/square and 150 Ohms/square.

9. The differential transmission assembly of claim 8, wherein the resistive sheet has a characteristic sheet resistance of approximately 100 Ohms/square.

10. The differential transmission assembly of claim 1, wherein the differential transmission assembly comprises a printed circuit board.

11. The differential transmission assembly of claim 1, wherein the differential transmission assembly comprises an integrated circuit.

12. The differential transmission assembly of claim 6, wherein an electric field of a differential signal carried by the differential transmission assembly is predominately perpendicular to the third plane, and
wherein an electric field component of a common mode signal carried by the differential transmission assembly is predominately parallel to the third plane.

13. The differential transmission assembly of claim 12, wherein the resistive sheet reduces amplitudes of the common mode signal.

14. The differential transmission assembly of claim 1, wherein the differential transmission assembly is implemented in a micro-strip.

15. The differential transmission assembly of claim 1, wherein the differential transmission assembly is implemented in a strip-line.

16. The differential transmission assembly of claim 1, wherein the differential transmission assembly is implemented in a filter.

* * * * *